March 26, 1935.    W. J. DEAN    1,995,767
METHOD OF MANUFACTURING ARTICLES FROM LATEX
Filed Dec. 12, 1932    2 Sheets-Sheet 2
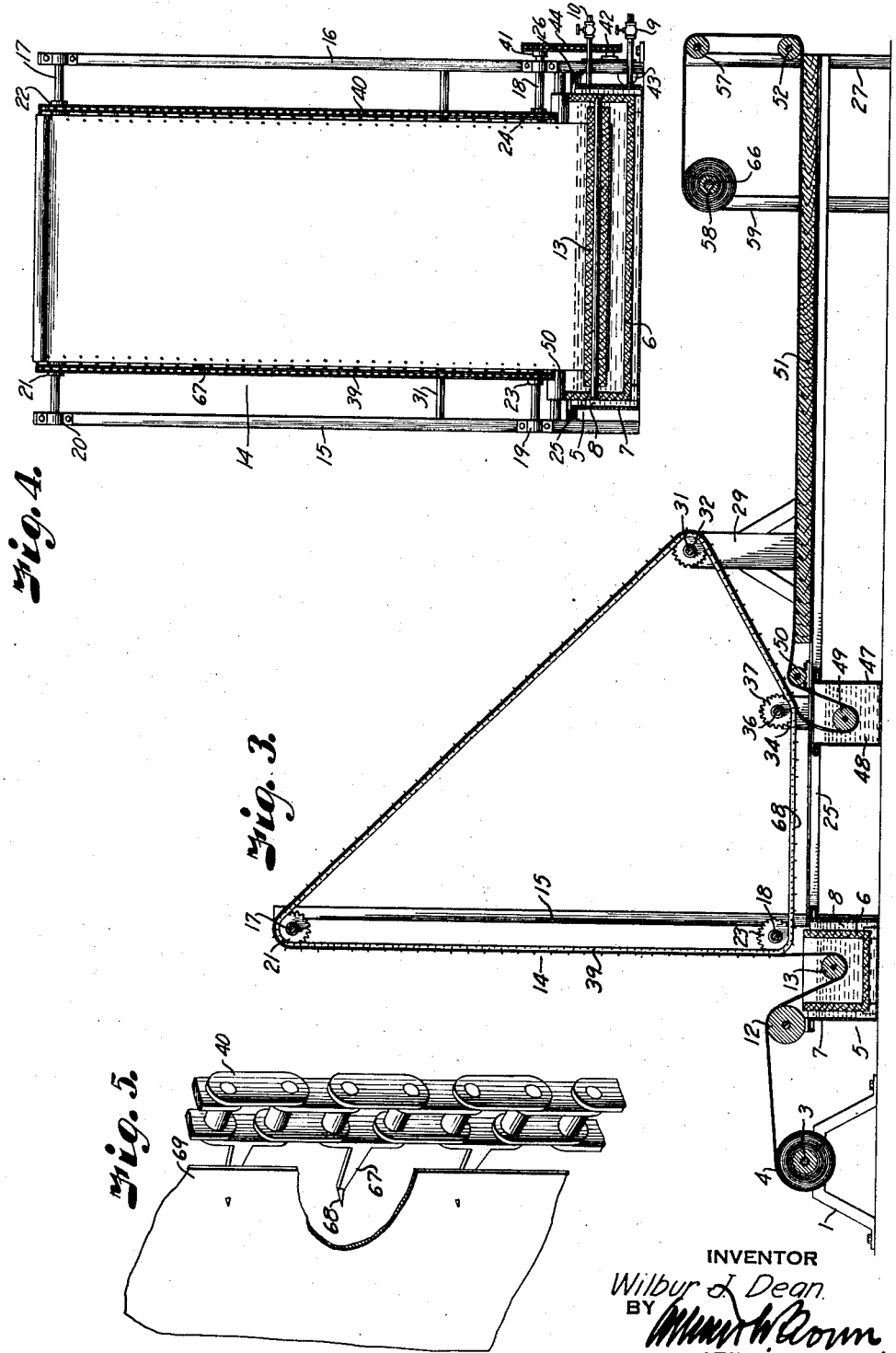
INVENTOR
Wilbur J. Dean.
BY
ATTORNEY Patented Mar. 26, 1935

1,995,767

UNITED STATES PATENT OFFICE 1,995,767

METHOD OF MANUFACTURING ARTICLES FROM LATEX

Wilbur J. Dean, North Kansas City, Mo.

Application December 12, 1932, Serial No. 646,857

5 Claims. (Cl. 91—68)

This invention relates to a process for manufacturing rubber goods and particularly to their production directly from rubber latex.

The usual procedure in manufacturing rubber goods from latex is to dip a form or other vehicle into a bath of latex to effect a latex coating thereon, after which the form is withdrawn from the bath and the coating is allowed to coagulate and cure in the air.

Owing to the fact that latex is slow to coagulate, the latex begins to run or drip before coagulation is effected. Consequently, the goods are of irregular thickness and have a streaked and smeary appearance.

It is, therefore, a principal object of the present invention to provide an improved process of manufacture from latex so that the goods are of uniform texture and entirely free from streaks and other blemishes incidental to slow coagulation of the latex.

It is also an important object of the present invention to remove the lipin constituent of the latex in order that the finished product will be entirely free from pores and other defects caused by the lipin.

In accomplishing these and other objects of the invention, I employ an apparatus for moving the vehicle through the various stages necessary in forming and curing a coating of latex, as illustrated in the accompanying drawings, wherein:

Fig. 1 is a perspective view of an apparatus particularly adapted for the manufacture of rubberized fabric from latex.

Fig. 2 is a highly enlarged section through a portion of rubberized fabric produced according to my process.

Fig. 3 is a longitudinal sectional view through the apparatus particularly illustrating the movement of the fabric through the latex bath and the subsequent water bath for removing the lipin constituent from the latex coating of the fabric.

Fig. 4 is a vertical cross sectional view through the apparatus at the point at which the fabric is coated.

Fig. 5 is an enlarged detail perspective view of one of the conveyor chains illustrating the method of securing the coated fabric in taut condition while it is being carried through the drying and curing zones.

Referring more in detail to the drawings:

1 and 2 designate spaced standards for mounting the ends of a shaft 3 which carries a roll of fabric 4 adapted to be unrolled and drawn through a bath of latex indicated at 5 that is contained in a tank 6.

The tank 6 is preferably provided with a jacket 7 forming a space 8 around the walls of the tank for circulation of a cooling medium whereby the temperature of the latex liquid is retained at approximately 40° F. to prevent its deterioration and the formation of a scum on its surface. For the cooling medium, I may use chilled water which is kept circulating through inlet and outlet connections 9 and 10 located at the end of the tank and communicating with the circulating space 8.

Extending parallel with the front wall of the tank and rotatably mounted in bearings 11 is a roller 12 which cooperates with a similar roller 13 mounted within the tank 6 below the surface of the latex, to guide the fabric and retain it in submergence while it is being moved through the tank.

In order to draw the fabric through the latex bath at the proper speed so that the coating will coagulate without running and to retain the fabric in stretched condition while it is passed through the drying and curing zone, I provide a suitable conveyor or carrier 14 as now to be described.

The carrier illustrated is supported forwardly of the tank 6 and includes spaced uprights 15 and 16 carrying upper and lower cross shafts 17 and 18 mounted in bearings 19 and 20 located adjacent the upper edge of the tank and at the tops of the supports respectively. Adjustably movable longitudinally of the shafts, but adapted to be fixed thereto are pairs of sprockets 21 and 22 and 23, 24. The conveyor frame also includes horizontal angle bars 25 and 26 having their ends fixed to the uprights 15 and 16 at a point adjacent the upper edge of the tank 5, and their opposite ends supported by posts 27 and 28. Supported on the angle bars 25 and 26 about midway of their length are bearing supports 29 and 30 for mounting a cross shaft 31 carrying sprockets 32 and 33 adapted to be aligned with the sprockets previously described. Also supported by the angle bars at points between the supports 29 and 30 and the supports 15 and 16 are bearings 34 and 35 for supporting a cross shaft 36 in the horizontal plane of the shaft 18.

The shaft 36 also carries spaced idler sprockets 37 and 38 cooperating with the other sprockets to support spaced endless conveyor chains 39 and 40 which are adapted to move upwardly through a perpendicular plane directly above the tank, then downwardly in an inclined plane away from the perpendicular plane, then through a plane inclined in a reverse direction and through a horizontal plane toward the tank to carry the fabric from the coating station through the drying and curing zones to a station where the lipin is removed.

In order to drive the conveyor belts, the outer end of the shaft 18 is provided with a sprocket 41 which is driven from a sprocket 42 on the drive shaft of a suitable gearing indicated by the housing 43, the sprockets being operably connected with an endless chain belt 44.

The power shaft 45 of the transmission may be directly connected with a suitable motor or other prime mover 46 whereby the conveyor is moved at the proper speed to effect deposit and cure of a coating on the fabric as later described.

Positioned under the bars 25 and 26 and extending parallel with the tank 6 at a point below the shaft 36 is a tank 47 for containing a washing liquid such as water indicated at 48 and through which the coated fabric is drawn for removing the lipin in the latex. The coated fabric is guided through the tank 47 under a roller 49 that is rotatably mounted in a tank similar to the roller 13 and over a roller 50 rotatably mounted adjacent the upper edge of the tank 47 to guide the fabric over a horizontal dusting table 51 which is supported on the angle bars 25 and 26 as best illustrated in Fig. 1.

At the opposite end of the table 51 is a roller 52 mounted in bearing brackets 53 and 54 carried on the posts 27 and 28 in such a position that the plane of the table is tangent to the lower face of the roller. Also mounted in bearings 55 and 56 at the upper ends of the posts is a roller 57 over which the fabric is guided in reverse direction toward a winding roller 58 that is rotatably supported on posts 59 and 60 located in front of the posts 27 and 28.

In order to rotate the winding roller for winding the coated fabric thereon, I provide a weight 61 whereby tension is applied to the fabric as it is moved over the dusting table. The weight 61 is suspended from a cable 62 which operates over a pulley 63 that is supported on the upper end of an extension 64 of the post 60. The lower end of the cable 62 is wound upon a drum 65 fixed to the outer end of the winding roller shaft 66. The weight 61 is sufficient to retain the fabric in taut condition and to effect winding of the fabric as well as effecting its withdrawal from the conveyor belts.

In order to attach the fabric to the conveyor belts certain of the links thereof are provided with inwardly projecting arms 67 having spurs or hook shaped points 68 to engage in the selvage edge 69 of the fabric, as best shown in Fig. 5.

In operating the apparatus constructed and assembled as described, the tank 6 is filled with latex or a suitable latex solution.

A roll of fabric strip 4 is mounted on the shaft 3 and the end of the strip threaded over the roller 12, under the roller 13, and attached to the spurs 68 that project from the sides of the conveyor chains.

The motor 46 is then operated to effect movement of the conveyor belts for drawing the fabric through the latex solution, thereby effecting a deposit of the latex on the fabric and movement of the fabric through the vertical and inclined curing zones.

For best results in effecting coagulation and curing of the latex, the air surrounding the apparatus is maintained at approximately 90° F. temperature.

As soon as the coated fabric contacts with the warm air the latex begins to coagulate and is carried by the conveyor belts through the vertical drying and curing zone and then downwardly and rearwardly toward the water tank where the fabric is automatically removed from the conveyor by its passage under the roller where it is drawn through the water wash tank and then across the dusting table.

In order to assure that the fabric is engaged by the spurs of the conveyor, an operator is stationed at each end of the tank 6 to stretch the fabric and secure the edges thereof to the spurs as the fabric emerges from the latex bath.

Movement of the fabric through the water in the tank 47 mechanically washes the lipin from the latex coating and collects in the form of slime or jell on the side walls of the tank.

The end of the fabric after passing the dusting table 51 is carried over the rollers 52 and 57, and is wound on the roller 58. As the coated fabric moves over the dusting table, it may be dusted with a suitable material to prevent adhering of the latex when the fabric is rolled.

If desired, the opposite face of the fabric may be dusted after passing the roller 57.

In order that the latex coagulates as fast as the coating is deposited the conveyor belts are operated at a speed of approximately one-half of one lineal foot per minute. This rate is such that the latex coagulates directly as it is withdrawn from the bath and a smooth, even textured material is provided entirely free from runs and other imperfections.

Upon removal of the lipin it may be desirable to apply a second coating of latex by rerunning the coated fabric through the latex tank or the process can be continuous by passing the fabric through another machine located in series with the apparatus illustrated in Fig. 1.

It is obvious that the process may be carried out in the formation of various types of rubber articles by equipping the conveyor chains with suitable forms which are progressively moved through the latex bath similarly to the movement of the fabric just described.

What I claim and desire to secure by Letters Patent is:

1. The continuous method of producing rubberized fabric in submergence from liquid latex including moving a strip of fabric through a bath of liquid latex to impregnate and interconnect the fibers of the fabric with latex, withdrawing the strip from the latex into a drying zone to effect coagulation of the latex, maintaining the rate of movement of the strip substantially equal to the rate of coagulation, and passing the strip through a water bath to remove lipin constituent of the latex coating progressively with the movement of the strip through said drying zone.

2. The method of producing rubberized fabric from liquid latex including moving a strip of fabric in submergence through a bath of liquid latex to impregnate and interconnect fibers of the fabric with latex, withdrawing the strip from the latex bath into a drying zone to effect coagulation of the latex, maintaining the bath of liquid latex at a temperature of approximately 40° F. to prevent formation of a scum on the surface thereof through which the strip is withdrawn, establishing a rate of movement of the strip substantially equal to the rate of coagulation at the time the strip is withdrawn from the liquid bath, and passing the strip through a water bath to remove the lipin constituent of the latex progressively with the movement of the strip through said drying zone.

3. The method of producing rubberized fabric from liquid latex including moving a strip of fabric in submergence through a bath of liquid latex to impregnate and interconnect fibres of the fabric with latex, withdrawing the strip from the latex bath into a drying zone maintained at substantially 90° F. temperature to effect coagulation of the latex coating, maintaining temperature of the bath of liquid latex at substantially 40° F. to prevent formation of scum on the surface of said latex bath through which the strip is withdrawn, maintaining a rate of movement of the strip substantially equal to the rate of coagulation adjacent the point at which the strip is withdrawn from the liquid bath, and passing the strip through a water bath to remove the lipin constituent of the latex progressively with the movement of the strip through the drying zone.

4. The method of producing rubberized fabric from liquid latex including moving the strip of fabric in submergence through a bath of liquid latex to impregnate and interconnect fibres of the fabric with latex, withdrawing the strip from the latex bath into a drying zone to effect coagulation of the latex on said strip, maintaining the rate of movement of the strip substantially equal to the rate of coagulation dusting one side of the coated strip, reversing direction of travel of the strip to expose the other side thereof, and dusting the last named side to prevent sticking of the coating upon rolling of the strip.

5. The method of producing rubberized fabric from liquid latex including moving a strip of fabric in submergence through a bath of liquid latex to impregnate and interconnect fibres of the fabric with latex, withdrawing the strip from the latex bath into a drying zone to effect coagulation of the latex on said strip, maintaining the liquid bath at a temperature of approximately 40° F. to prevent formation of a scum on the surface of the liquid bath through which the strip is withdrawn, and maintaining rate of movement of the strip substantially equal to the rate of coagulation.

WILBUR J. DEAN.